(12) United States Patent
Umeda et al.

(10) Patent No.: US 6,653,454 B1
(45) Date of Patent: Nov. 25, 2003

(54) FORMAZANE COMPOUNDS AND METHOD OF DYEING USING THE SAME

(75) Inventors: Mariko Umeda, Saitama (JP); Hideshiro Nomura, deceased, late of Saitama (JP), by Shigeko Nomura, executor; Yasuo Shirasaki, Saitama (JP); Eiichi Ogawa, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/889,189

(22) PCT Filed: Feb. 1, 2000

(86) PCT No.: PCT/JP00/00555

§ 371 (c)(1),
(2), (4) Date: Oct. 1, 2002

(87) PCT Pub. No.: WO00/46308

PCT Pub. Date: Aug. 10, 2000

(30) Foreign Application Priority Data

Feb. 8, 1999 (JP) ............................................. 11-030185

(51) Int. Cl.$^7$ .............................................. C09B 56/10
(52) U.S. Cl. ................................. 534/652; 8/674; 8/680
(58) Field of Search ............................. 534/652; 8/674, 8/680

(56) References Cited

U.S. PATENT DOCUMENTS

| | | | |
|---|---|---|---|
| 4,158,003 A | 6/1979 | Bitterlin et al. | 260/146 T |
| 5,149,789 A | 9/1992 | Jessen et al. | 534/618 |

FOREIGN PATENT DOCUMENTS

| | | |
|---|---|---|
| EP | 0 315 045 | 5/1989 |
| GB | 2 148 921 | 6/1985 |
| JP | 47-22955 | 6/1972 |
| JP | 60-67562 | 4/1985 |
| JP | 60-90264 | 5/1985 |
| JP | 62-288661 | 12/1987 |
| JP | 2-286752 | 11/1990 |
| JP | 2510876 | 4/1996 |

Primary Examiner—Fiona T. Powers
(74) Attorney, Agent, or Firm—Nields & Lemack

(57) ABSTRACT

The present invention relates to a novel blue dye compound represented by Formula (1) as shown below, which can be synthesized without a dianisidine compound used for a raw material and can dye a cellulosic high molecular material to provide the blue dyed product that has a high color value, a good build-up and various kinds of good fastness; a method for dyeing a cellulosic high molecular material by using the same; and a cellulosic high molecular material dyed with the same.

A formazan compound represented by

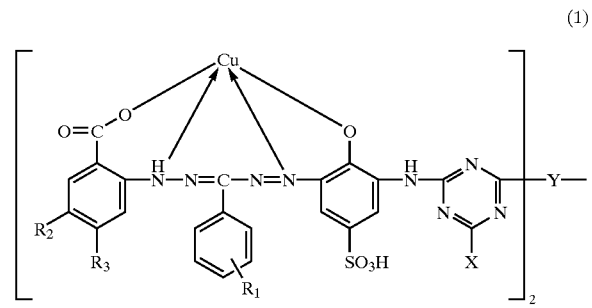

(In Formula (1), $R_1$ is hydrogen, sulfo, hydroxy, chloro, methoxy, carboxyl or alkyl; either of $R_2$ and $R_3$ is hydrogen and the other is sulfo; X is morpholino, 2-hydroxyethylamino or bis(2-hydroxyethyl)amino; and Y is a phenylene diimino represented by Formula (2) as shown below

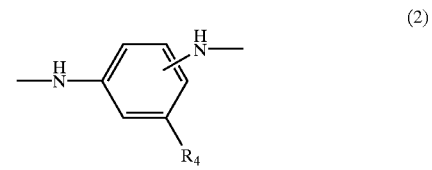

(In Formula (2), $R_4$ is sulfo or carboxyl)) or the salt thereof.

6 Claims, No Drawings

FORMAZANE COMPOUNDS AND METHOD OF DYEING USING THE SAME

TECHNICAL FIELD

The present invention relates to a formazan compound, a method for dyeing using the same, and a cellulosic high molecular material dyed therewith.

BACKGROUND ART

The dianisidine type dye such as C.I.Direct Blue 200, 202 and 203 has been known as a dyestuff to dye a cellulosic high molecular material fast in blue and has been used on a large scale in textile dyeing industry and in paper manufacturing industry. However, in production and use of an dianisidine, which is a mother compound for the dye, a particular attention and restriction for use are inevitable because it is a prescribed chemical.

Various substitutes for dianisidine have been developed, but any products have not yet brought a satisfactory effect. For example, JP No.2510876 discloses a formazane type direct dye, which is disadvantageously inferior in fitness for dyeing at a high temperature and in fastness to washing. It is desired that there should be developed a blue dye that is safer for environmental protection and is more excellent in dyeing performance. The dye is also required to retain an affinity for a cellulose fiber even at a high temperature because the product obtained by blending a cellulose fiber with a polyester fiber is dyed at the high temperature.

Therefore, it is an important problem to develop the blue dye to meet the above requirements, in other words, a dye that can be synthesized without dianisidine compound used for the raw material and is suitable for dyeing a cellulosic high molecular material to provide the dyed product that has a high color value, a high build-up and various kinds of good fastness.

DISCLOSURE OF THE INVENTION

The present inventors made a diligent study to solve the above problem and, as a result, have arrived at the present invention.

The present invention relates to the followings:

1. A formazan compound represented by Formula (1) as shown below or the salt thereof,

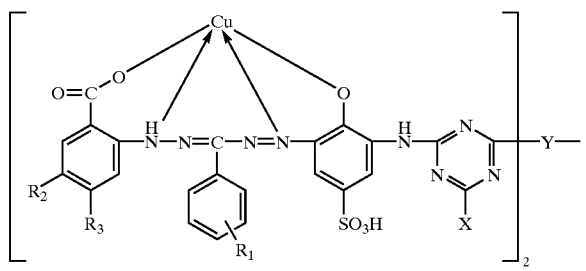 (1)

(In Formula (1), $R_1$ is hydrogen, sulfo, hydroxy, chloro, methoxy, carboxyl or alkyl; either of $R_2$ and $R_3$ is hydrogen and the other is sulfo; X is morpholino, 2-hydroxyethylamino or bis(2-hydroxyethyl)amino; and Y is a phenylene diimino represented by Formula (2) as shown below)

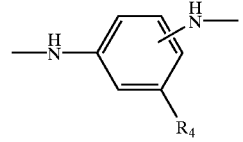 (2)

(In Formula (2), $R_4$ is sulfo or carboxyl)

2. A formazan compound or the salt thereof according to the item 1, wherein $R_1$ is hydrogen; either of $R_2$ and $R_3$ is hydrogen and the other is sulfo; X is morpholino, 2-hydroxyethylamino, or bis(2-hydroxyethyl)amino; and Y is a group represented by Formula (2) wherein the two imino groups bind to the phenylene group at their respective para-positions.

3. A formazan compound or the salt thereof according to the item 1, wherein $R_1$ is hydrogen; $R_2$ is hydrogen; $R_3$ is sulfo; X is morpholino or bis(2-hydroxyethyl)amino; and Y is a group represented by Formula (2) wherein the two imino groups bind to the phenylene group at para-position.

4. A formazan compound or the salt thereof according to the item 1, wherein $R_1$ is hydrogen; $R_2$ is hydrogen; $R_3$ is sulfo; X is morpholino; and Y is a group represented by Formula (2) wherein $R_4$ is sulfo and the two imino groups bind to the phenylene group at para-position.

5. A method for dyeing a cellulosic high molecular material which is characterized by using the formazan compound or the salt thereof according to any one of the item 1 to 4.

6. A cellulosic high molecular material dyed with the formazan compound or the salt thereof according to any one of the item 1 to 4.

BEST MODE FOR CARRYING OUT THE INVENTION

The novel formazan compound of the present invention is represented by Formula (1) as shown above. In Formula (1), the alkyl group for $R_1$ includes a C1–C4 alkyl group such as methyl, ethyl, n-propyl and n-butyl. Methyl or ethyl is preferable. $R_1$ is preferable to substitute at the 2-position or 4-position.

The typical examples of the novel formazan compounds of the present invention represented by Formula (1) as shown above are listed in Table 1. In the column Y, PAS is a group represented by Formula (2) wherein $R_4$ is sulfo and the two imino groups bind to the phenylene group at para positions; PAK is a group represented by Formula (2) wherein $R_4$ is carboxyl and the two imino groups bind to the phenylene group at para positions; MAS is a group represented by Formula (2) wherein $R_4$ is sulfo and the two imino groups bind to the phenylene group at meta positions; and MAK is a group represented by Formula (2) wherein $R_4$ is carboxyl and the two imino groups bind to the phenylene group at meta positions. When the two imino groups in Formula (2) bind to the phenylene group at para positions and when the two imino groups in Formula (2) bind to the phenylene group at meta positions, the respective chemical formula is shown in following Formula (2-1) and Formula (2-2)) repectively:

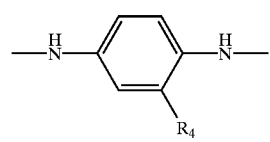 (2-1)

-continued (2-2)

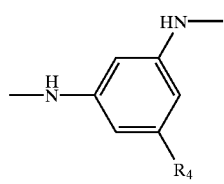

TABLE 1

| No. | $R_1$ | $R_2$ | $R_3$ | X | Y |
|---|---|---|---|---|---|
| 1 | H | H | $SO_3H$ | morpholino | PAS |
| 2 | H | H | $SO_3H$ | 2-hydroxyethyl amino | PAS |
| 3 | H | H | $SO_3H$ | bis(2-hydroxyethyl) amino | PAS |
| 4 | H | H | $SO_3H$ | morpholino | PAS |
| 5 | H | H | $SO_3H$ | 2-hydroxyethyl amino | PAK |
| 6 | H | H | $SO_3H$ | morpholino | MAS |
| 7 | H | H | $SO_3H$ | bis(2-hydroxyethyl) amino | MAK |
| 8 | H | $SO_3H$ | H | morpholino | PAS |
| 9 | 2-$SO_3H$ | $SO_3H$ | H | morpholino | PAS |
| 10 | 2-OH | H | $SO_3H$ | morpholino | PAS |
| 11 | 4-Cl | H | $SO_3H$ | morpholino | PAS |
| 12 | 4-$OCH3$ | H | $SO_3H$ | morpholino | PAS |
| 13 | 4-COOH | H | $SO_3H$ | morpholino | PAS |
| 14 | 4-$C_2H_4$ | H | $SO_3H$ | morpholino | PAS |

In order to obtain a formazan compound of the present invention represented by Formula (1), the formazan amino compound represented by Formula (3) as shown below is at first synthesized by a process as described below for example:

An amino benzoic acid is diazotized to get the diazo product, from which the hydrazine is derived. 1 mol of the hydrazine is condensed with 1 mol of a benzaldehyde in the aqueous solution at 80–95° C. to get the phenylhydrazone. The phenylhydrazone is coupled with 1 mol of the diazotized product of 6-acetylamino-2-aminophenol-4-sulfonic acid in the aqueous solution under the presence of soda ash at 0–5° C. Then, 1–1.5 mol of copper sulfate or copper chloride is added to introduce copper into the coupling compound. The compound thus obtained is treated with a strong alkali at 60–90° C. for 3–6 hours to hydrolyze the acetylamino group and the formazan amino compound represented by Formula (3) is obtained.

(3)

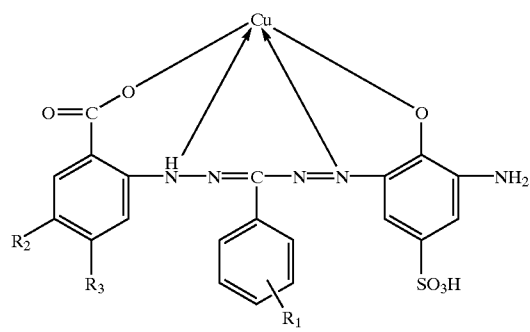

(In Formula (3), $R_1$, $R_2$, and $R_3$ show their respective same meanings as described above)

The formazan compound of Formula (1) is then synthesized through a process as described below for example.

1 mol of the formazan amino compound represented by Formula (3) is reacted with 1 mol of 2,4,6-trichloro-1,3,5-triazine at a pH of 6–8 at 0–10° C. for 2–3 hours to get the first condensate. 2 mol of a primary condensate is then reacted with 1 mol of a diamine corresponding to Y at a pH of 6–9 at 50–65° C. for 8–24 hours to get a secondary condensate. 1 mol of a secondary condensate is reacted with 2 mol of an amine corresponding to X at a pH of 6–9 at 80–95° C. for 6–18 hours to get a tertiary condensate, that is, the formazan compound represented by Formula (1).

The formazan compound represented by Formula (1) of the present invention also can be synthesized through the following process.

2 mols of 2,4,6-trichloro-1,3,5-triazine are reacted with 1 mol of diamine corresponding to Y at a pH of 5–8 at 0–10° C. for 2–4 hours to get the first condensate. 1 mol of a primary condensate is reacted with 2 mol of the formazan amino compound represented by Formula (3) at a pH of 6–9 at 50–65° C. for 2–4 hours to get a secondary condensate. 1 mol of a secondary condensate is reacted with 2 mol of an amine corresponding to X at a pH of 6–9 at 80–95° C. for 6–18 hours to get the formazan compound represented by Formula (1).

The formazan compound represented by Formula (1) thus synthesized is generally isolated as the sodium salt thereof by a conventional procedure, for example, by salting out with sodium chloride.

The compound represented by Formula (1) of the present convention may be used in any form of the free acid and the salt. The salt is preferably soluble in water. The salt includes an alkali metal salt, an alkaline earth metal salt, an alkyl amine salt (for example, a C1–C4 lower alkyl amine such as monomethyl amine and diethyl amine), an alkanol amine salt and an ammonium salt. The preferable salt includes an alkaline metal salt such as a sodium salt, a potassium salt and a lithium salt; and a C1–C3 alkanol amine salt such as a monoethanol amine salt, a diethanol amine salt, a triethanol amine salt, a monoisopropanol amine salt, diisopropanol amine salt and a triisopropanol amine salt.

Each the salt of Formula (1) as described above can be obtained, for example, by the following process.

A crystal of the sodium salt obtained by the method mentioned above is dissolved in water and the obtained solution is acidified by adding an acid, and then filtered if necessary. The cake thus obtained is again dissolved in water, followed by adding a base, for example, potassium hydroxide, lithium hydroxide, aqueous ammonia or an amine such as diethanol amine or triethanol amine to obtain the potassium salt, the lithium salt, the ammonium salt or an amine salt such as the diethanol amine salt and triethanol amine salt respectively. The formazan compound represented by Formula (1) may be a dried product obtained by conventional salting out or be a liquid product obtained by diluting or condensing the reaction solution to adjust the concentration.

The formazan compound represented by Formula (1) may be used as a direct dye to dye a natural or regenerated cellulosic high molecular material. The cellulosic high molecular material to dye includes a natural cellulose fiber such as cotton and hemp, a regenerated cellulose fiber such as rayon, a blended fiber product containing thereof, a paper and a pulp.

A dipping dyeing method, a printing dyeing method and a padding dyeing method are used for dyeing the natural or regenerated cellulose fiber, and the dipping dyeing method is the most preferable.

The natural or regenerated cellulose fiber may be dyed with the compound represented by Formula (1) of the present invention by a dipping. In that case, a material to dye is introduced in a dyeing bath at 40–50° C. under the condition of a relatively large bath ratio, followed by elevating the dyeing bath temperature to 80–100° C. gradually and keeping the temperature for 20–60 minutes to dye. Before the bath temperature reaches the actual dyeing temperature or after as the case may be, a neutral salt such as sodium chloride and sodium sulfate may be added to the bath so as to accelerate the absorption of the dyestuff.

A blended fiber product containing polyester fiber and rayon can be dyed by using a compound represented by the formula (1) together with a disperse dye in a single bath by a high temperature dyeing method at 120–130° C., wherein the pH is preferably adjusted to a neutral or an alkaline range by a pH regulating agent. The compound represented by Formula (1) of the present invention does not lose the affinity for the blended fiber product even if it is used for dyeing at a high temperature. Furthermore, the compound, if it is used for dyeing in combination with a general-purpose yellow or red dyestuff, can bring a good dyeing reproducibility because of their uniform affinities for the fiber. The dyed product obtained by using the compound represented by Formula (1) of the present invention is excellent in light fastness, washing fastness and chlorine fastness, and has a high color value and a good build-up property.

Dyeing a paper or a pulp product with the compound of the present invention will be described below. A dyeing method of a paper product is mainly classified (I) an internal addition way in which a dyestuff is added to dye when the pulp is disintegrated or beaten to loose into pieces and (II) an external addition way in which a dye is added in the size press solution in size press process. Furthermore, an another method may be used, in which a surface of a paper is over-coated by a coating solution prepared with a dyestuff, an inorganic white pigment and a binder, etc. The formazan compound represented by Formula (1) is applicable for all the above ways. The most preferable for the compound is the internal addition way. In the internal addition way, the pulp is at first beaten until a beating degree of 400–490 c.c. by a pulper or a refiner to obtain a pulp slurry, then, 0.01–3.0% by weight (relative to the dried paper) of the formazan compound represented by Formula (1) is added to the slurry at a temperature of 10–40° C. and, further, a usual filler, a sizing agent, a sulfuric acid band, a paper reinforcement and a binder which are conventionally used are added if necessary, followed by making paper and drying according to a conventional process to get a paper dyed with the formazan compound represented by Formula (1). The formazan compound represented by Formula (1) has an affinity for paper (a cellulosic high molecular material), and can provide the dyed paper with high color value and good fastness (light fastness).

EXAMPLE

The present invention will be described in more detail, but is not limited to, with reference to Examples. In the Examples, "part" and "%" show "part by mass" and "% by mass" respectively. A sulfo group is represented in the free acid form.

Example 1

5.0 parts of 2,4,6-trichloro-1,3,5-triazine was added in a solution containing of 15 parts of water, 10 parts of ice and 0.5 parts of 10% aqueous Lipal OH (trade name, an anionic surfactant, made by Lion KK) solution under stirring. The resultant solution was stirred for 30 minutes, kept at a temperature of 3° C. or less, and poured into a solution obtained by dissolving 16.0 part of the formazan amino compound of Formula (3) (wherein $R_1$ is hydrogen, $R_2$ is hydrogen, and $R_3$ is a sulfo group) in 180 parts of water. Then, maintaining pH 6–8 by adding dropwise 10% aqueous soda ash solution at about 10° C., reaction was conducted for 2 hours to get a reaction solution containing a primary condensate.

Thereafter, a solution obtained by dissolving 2.6 parts of 1,4-diaminobenzene-2-sulfonic acid in 25 parts of water at a weak acid condition was added to the above reaction solution to get a mixture, followed by elevating the temperature of the mixture and reacting at 50–60° C. at pH 6–8 maintained with 10% aqueous soda ash solution for 6 hours to get a reaction solution containing a secondary condensate.

3.5 parts of morpholine was added to the above reaction solution, followed by elevating the temperature and reacting at 85–90° C. for 8 hours maintaining pH about 7. Then, salting out with sodium chloride in amount of 5% to the solution at the same temperature, the crystal was filtered to isolate and dried to get 33.5 parts of powder containing the compound No. 1 (sodium salt) (the compound of Formula (1), wherein each of $R_1$ and $R_2$ is hydrogen, $R_3$ is sulfo, X is morpholino, and Y is PAS; $\lambda_{max}$: 595 nm in water).

Example 2

5.0 parts of 2,4,6-trichloro-1,3,5-triazine was added in a solution containing of 15 parts of water, 15 parts of ice and 0.05 parts of 10% aqueous Lipal OH solution under stirring, followed by stirring for 45 minutes. To the resultant solution was poured a solution obtained by completely dissolving 2.5 parts of 1,4-diaminobenzene-2-sulfonic acid in 40 parts of water at a maintained temperature of 8° C. or less, followed by reacting at a pH 6–8 maintained with 10% aqueous soda ash solution for 11 hours to get a reaction solution containing a primary condensate.

The above reaction solution was added to a solution obtained by completely dissolving 17.4 parts of the formazan compound of Formula (3) (the same compound as used in Example 1) in 130 parts of water to get a mixture, followed by elevating the temperature of the mixture and reacting at 50–60° C. at a pH 6–8 maintained with 10% aqueous soda ash solution for 4 hours to get a reaction solution containing a secondary condensate.

3.5 parts of morpholine was added to the above reaction solution containing a secondary condensate, followed by elevating the temperature and reacting at 85–90° C. at a maintained pH of about 7 for 8 hours. Then, salting out with sodium chloride in amount of 7% to the solution at the same temperature, a crystal was filtered to isolate and dried to get 46.2 parts of powder containing the compound No.1 (sodium salt).

Example 3

1 part of the powder containing the compound of No.1 obtained in Example 1 was dissolved in 200 parts of boiled water, followed by adding 10 parts of anhydrous sodium sulfate and 800 parts of water to prepare a dyeing bath. To the solution was dipped 50 parts of a viscose rayon cloth, followed by elevating the temperature to 90° C. gradually under stirring and keeping the condition for 40 minutes to dye. Then, the cloth was washed with water and dried to get a blue dyed product that had a good finishing.

50 parts of the above dyed product was added in a polyamine fixing agent solution obtained by dissolving 2 parts of fixing agent (Splafix DFC: trade name, made by Senka KK) in 1000 parts of water, followed by dipping at 60° C. for 20 minutes and then drying.

The dyed product thus obtained did not show a color changing or fading caused from treating with a fixing agent. The dyed product was excellent in light fastness, washing fastness and chlorine fastness. The results are shown in Table 2.

Comparative Example 1

The viscose rayon cloth was dyed with C.I.Direct Blue 200(a dianisidine dyestuff) and dried to get a blue dyed product as in Example 3. The dyed product showed a large color changing caused from the same treating with the fixing agent as in Example 3. The various kinds of fastness are shown in Table 2.

Comparative Example 2

The viscose rayon cloth was dyed with the dyestuff (represented by the Formula (4) as illustrated below) described in Example 1 of JP No.2510876 and dried to get a blue dyed product as in Example 3. The dyed product was similarly treated with a fixing agent as in Example 3. The various kinds of fastness are shown in Table 2.

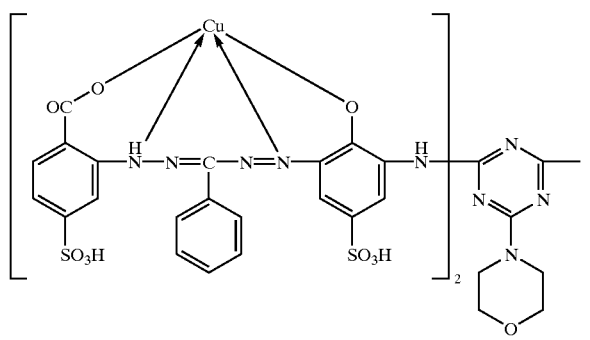

(4)

TABLE 2

|  | Vividness | Fixing color changing | Applicability of high temp. Dyeing | Light | Fastness Washing | Chlorine |
|---|---|---|---|---|---|---|
| Exp. 3 | ○ | ○ | ○–Δ | 5 | 4–5 | 3–4 |
| Comp. 1 | X | X | ○ | 5 | 5 | 2–3R |
| Comp. 2 | ○ | ○ | X | 5 | 3 | 3 |

(note)
Exp. 3: means Example 3,
Comp. 1: means Comparative Example 1
Comp. 2: means Comparative Example 2

Method of Fastness Test

The dyed cloth treated with the polyamine fixing agent was tested.

Light fastness: JIS L0842 Carbon Arc Fade Meter,
Irradiation Time: 20 hrs, 40 hrs
Washing: JIS L0884 A-2 method
Chlorine water: JIS L0884 weak (Determination and Indication of Result)
Vividness: Visual observation of dyed clothes after treatment for fixing
  ○: a high vividness X: a low vividness
Fixing color changing: Visual observation of a change in hue caused from fixing treatment
  ○: no change X: a large change Adaptability to high temperature dyeing: Visual observation of difference between the density of a dyed cloth at 90° C. and that of at 130° C.
  ○: no perceivable difference, Δ: a small difference,
  X: a large difference Light fastness: Determination in degree of a color changing or fading according to the blue scale (JIS L0842)

Washing: Determination in degree of a staining to a white rayon cloth according to the gray scale for staining (JIS L0805)

Chlorine water: Determination in degree of a color changing or fading according to the gray scale for color changing or fading (JIS L0804)/R shows "reddish".

The dyed cloth, if dyed by the dianisidine dyestuff of Comparative Example 1, had a low vividness and showed a large color changing caused from treating with the fixing agent, and was inferior to that in case of Example 3 in chlorine fastness. The dyestuff of Comparative Example 2 had a lowered affinity to the cloth at a high temperature of 130° C., failing to bring a desired density. The dyed cloth was remarkably inferior to that in case of Example 3 in washing fastness.

Example 4

1 part of the powder containing the compound No.1 obtained in Example 1 was dissolved in 200 parts of hot water, followed by adding 10 parts of anhydrous sodium sulfate, 2 parts of Kayaku Buffer P-7(trade name, a pH adjusting agent, made by Nippon Kayaku KK) and 800 parts of water to prepare a dyeing bath having a pH 7. To the solution was dipped 50 parts of a viscose rayon cloth, followed by elevating the temperature to 130° C. gradually under stirring and keeping the condition for 60 minute to dye. Then, the cloth was washed with water and dried to get a blue dyed product that had a good finishing because the compound did not lose the affinity even at the high temperature.

Example 5

A dyeing bath having the composition as described below was prepared. In the composition, Kayacelon Yellow TR (trade name) and Kayacelon Rubine TR (trade name) are the direct dyes manufactured by Nippon Kayaku KK.

The powder containing the compound

| No. 1 obtained in Example 1 | 0.25 parts |
| Kayacelon Yellow TR | 0.40 parts |
| Kayacelon Rubine TR | 0.25 parts |
| Kayaku Buffer P-7 | 2 parts |
| Anhydrous sodium sulfate | 10 parts |
| Pure water | 1000 parts |

In the dyeing bath was dipped 50 parts of a viscose rayon cloth, followed by elevating the temperature to 130° C. gradually under stirring and keeping the condition for 60 minutes to dye. Then, the dyed cloth was washed with water and dried to get an uniformly dyed brown product because of uniform affinities of the dyestuffs.

Example 6

A dyeing bath was prepared from 0.05 parts of the powder containing the compound No.1 obtained in Example 1 and 60 parts of water. To the dyeing bath were added 2 parts (dry weight) of pulp and 0.04 parts of anhydrous sodium sulfate, followed by stirring at the room temperature for 15 minutes. Then, 0.02 parts of RF-size880L-50 (trade name, a sizing agent, made by Misawa Ceramic Chemical KK) was added, followed by stirring for 10 minutes, adding 0.06 parts of crystalline aluminium sulfate and stirring for another 20 minutes. The resultant solution was treated according to the method as described in JIS 8209 (the method for preparing a hand-made paper for pulp testing) to make a paper, which was then dried to get a blue colored paper. The paper was good in light fastness.

Industrial Applicability

The formazan compound of the present invention is safer for environmental protection and can dye a cellulosic high molecular material to provide the dyed product with a high color value, a high build-up and various kinds of good fastness. Furthermore, in dyeing of a fiber, the compound can dye a blended fiber product containing of a cellulosic fiber and a polyester fiber with good dyeing reproducibility, because the compound does not lose an affinity to the fiber even in a high temperature dyeing and has a matching affinity in case of dyeing in combination with a general-purpose yellow or red dyestuff. The compound also can dye a paper to provide the blue dyed product that has a good finishing and a good light fastness. The compound can be synthesized without dianisidine compound used for a raw material and provides a vivid dyed product.

What is claimed is:

1. A formazan compound represented by Formula (1) as shown below or the salt thereof,

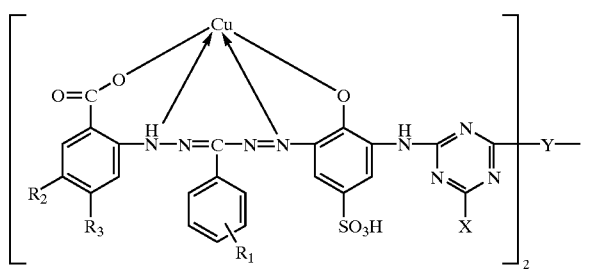

(1)

(In Formula (1), $R_1$ is hydrogen, sulfo, hydroxy, chloro, methoxy, carboxyl or alkyl; either of $R_2$ and $R_3$ is hydrogen and the other is sulfo; X is morpholino, 2-hydroxyethylamino or bis(2-hydroxyethyl)amino; and Y is a phenylene diimino represented by Formula (2) as shown below

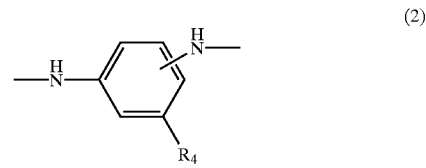

(2)

(In Formula (2), $R_4$ is sulfo or carboxyl)).

2. A formazan compound or the salt thereof according to claim 1, wherein $R_1$ is hydrogen; either of $R_2$ and $R_3$ is hydrogen and the other is sulfo; X is morpholino, 2-hydroxyethylamino, or bis(2-hydroxyethyl)amino; and Y is a group represented by Formula (2) wherein the two imino groups bind to the phenylene group at para-positions.

3. A formazan compound or the salt thereof according to claim 1, wherein $R_1$ is hydrogen; $R_2$ is hydrogen; $R_3$ is sulfo; X is morpholino or bis(2-hydroxyethyl)amino; and Y is a group represented by Formula (2) wherein the two imino groups bind to the phenylene group at para-positions.

4. A formazan compound or the salt thereof according to claim 1, wherein $R_1$ is hydrogen; $R_2$ is hydrogen; $R_3$ is sulfo; X is morpholino; and Y is a group represented by Formula (2) wherein $R_4$ is sulfo and the two imino groups bind to the phenylene group at para-positions.

5. A method for dyeing a cellulosic high molecular material, which is characterized by using the formazan compound or the salt thereof according to any one of claim 1 to 4.

6. A cellulosic high molecular material dyed with the formazan compound or the salt thereof according to any one of claim 1 to 4.

* * * * *